Patented June 23, 1942

2,287,484

UNITED STATES PATENT OFFICE

2,287,484

COATING COMPOSITION AND USE THEREOF

Louis Pereny, Homewood, and George A. Meisinger, Chicago, Ill., assignors to The Sherwin-Williams Company, Cleveland, Ohio, a corporation of Ohio No Drawing. Application May 8, 1939, Serial No. 272,462

4 Claims. (Cl. 117—7)

The present invention relates to coating compositions and coatings involving essentially ethyl cellulose.

Among the cellulose ethers used as a base for coating compositions, ethyl cellulose is most common, perhaps for the reason that it is most available and least expensive. Many uses for it are known or suggested. One of the desired uses is as an aeroplane dope. Its lack of combustibility compared to nitrocellulose is a feature of importance in its favor. However, its use in this field is indicated only by publication, and is not confirmed by actual practice so far as we have been able to determine. We believe this is due to the fact that tests of it for such use have shown it to lack tautening power. Numerous publications attest the desirability of using it, and show tests from which conclusions adverse to its use have been drawn. See "Suitability of Plastics for Airplane Dopes" by Gordon M. Kline and C. G. Malmberg of National Bureau of Standards, Industrial and Eng. Chem., vol. 30, No. 5 (May 1938) pages 542 to 549. It is herein stated that ethyl cellulose produces variable results, and that it produces the least amount of tautening of six cellulose derivatives most nearly suitable for aeroplane dope use.

It is also reported by Ruizhkov (1936 Chem. Abstracts, page 8660) as follows:

"Linen, specially prepared for airplane use, was treated with a lacquer containing ethyl cellulose 8%, cresol and triphenyl phosphate 0.32% each and a solvent consisting of benzol 40 parts, toluol 40 parts, ethanol 20 parts. The resulting films cannot stand up against benzene or water and are not suited for airplane use."

These and other reports have lead away from the idea of using ethyl cellulose as a base for aeroplane dope.

We have actually coated a fabric-covered aeroplane with an ethyl cellulose dope, and in doing so, found that ethyl cellulose under certain conditions does have tautening power. But at the same time we discovered that this composition which did tauten, lacked resistance to gasoline. For this reason the composition was not suitable as a dope, in spite of its tautening power.

In further experimentation we discovered how to make an aeroplane dope which has tautening power, and resistance to gasoline, lubricating grease and oil, and other like hydrocarbons. We discovered that we could make an ethyl cellulose base composition which has resistance to such hydrocarbons, and which may even contain such hydrocarbon. We also found that the property of tautening does not necessarily accompany the property of resistance to injury by contact with hydrocarbon, or stability by reason of inclusion of hydrocarbon.

Heretofore, ethyl cellulose has been used in compositions which are resistant to lubricating oils and greases, but such compositions are essentially more than ethyl cellulose base. We refer particularly to the products of Patents No. 2,129,156 and No. 2,129,157, in which the essential bases are ethyl cellulose and an ester of a polyhydric alcohol and an omega-omega dicarboxylic aliphatic acid having at least a six-carbon chain. The present invention is distinguished by the fact that ethyl cellulose as specified herein is the only essential ingredient of our compositions.

It is an object of the present invention to provide ethyl-cellulose base coating compositions and coatings, which are resistant to injury by contact with hydrocarbons.

It is another object of the present invention to provide ethyl-cellulose base coating compositions and coatings which may contain non-volatile hydrocarbons without the said hydrocarbons rendering the coating unstable.

It is a particular object of the invention to provide an ethyl cellulose base coating composition which combines tautening power for fabric, and resistance to injury by contact with gasoline, lubricating oil and grease, and like hydrocarbons.

It is another object of the invention to provide an ethyl cellulose base coating composition in which ethyl cellulose and plasticizer are so combined that a tautening composition results.

Various other and ancillary objects and advantages of the invention will become apparent from the following description and explanation of the invention.

Ethyl cellulose contains in its molecular structure the chemical grouping $-OC_2H_5$ which is referred to as the "ethoxyl" group. Its content in ethyl cellulose varies, and with such variance, the properties of ethyl cellulose vary. Ethyl cellulose also varies in viscosity characteristics. This is measured by some set condition of testing, in principle measuring the viscosity of a solution of a given amount of ethyl cellulose in a given solvent.

Frequently, viscosity is important in selecting ethyl cellulose. Solubility may be more important, so that ethyl cellulose is selected according to its solubility characteristics.

The solubility characteristics of ethyl cellulose vary with the ethoxyl content. As the ethoxyl content increases the solubility of ethyl cellulose in both aliphatic and aromatic hydrocarbons increases, while its solubility in alcohols decreases. Conversely, as the ethoxyl content decreases, the solubility of ethyl cellulose in hydrocarbons decreases, and its solubility in alcohols increases. When the ethoxyl content is below 42% by weight there is a marked reduction in its solubility in organic solvents.

In testing various forms of ethyl cellulose we have found that within the range from 42% to 47.5% ethoxyl content by weight, ethyl cellulose base coatings are resistant to change from aliphatic hydrocarbons in the coating or in contact with the coating. Within this range, ethyl cellulose is soluble in mixtures of aliphatic alcohols and aromatic hydrocarbons, permitting use of solutions which deposit good coatings.

The coatings may be with or without plasticizer or resins, or other cellulose derivatives. The solvents for the ethyl cellulose of 42% to 47.5% ethoxyl content permit use of such modifying agents.

In the range from 47.5% to 49.0% ethoxyl content, ethyl cellulose films, for example on aeroplane wings, crack badly from the effect of gasoline thereon. There is embrittlement. Only slight pressure or vibration is required to crack them when wet with gasoline. If the continuity of a film has been destroyed and the rupture is then wet with gasoline, further rupture will result. Above 49% ethoxyl content, the films soften and become tacky to a degree increasing with the ethoxyl content.

Therefore, in accordance with the present invention ethyl cellulose is employed which has upwardly from 42% to below 47.5% ethyl cellulose Where we desire tautening power we may secure it by observing the proportion of the said ethyl cellulose to the plasticizer employed. Generally, we have found that when more than 4 to 5 parts by weight of ethyl cellulose are used to 1 part by weight of plasticizer, the tautening power is in evidence. The ratio given is about the critical ratio. When a less proportion of ethyl cellulose is used, the tautening power drops or disappears. Above this proportion, increase of ethyl cellulose increases the tautening power. The critical point is not sharp, nor is it herein defined with precision for various reasons. The critical point depends upon the kind of ethyl cellulose, the kind of plasticizer, and other elements of a formulation. The critical proportion given is merely an indication of the region in which it lies.

The following examples illustrate the invention:

EXAMPLE 1.—*Clear aeroplane dope*

| | Parts by weight |
|---|---|
| Ethyl cellulose (44.5% ethoxyl) (viscosity 45-50 seconds) | 10.3 |
| Tricresyl phosphate | 1.5 |
| Ethanol | 36.7 |
| Toluol | 44.1 |
| Xylol | 7.4 |
| | 100.0 |

EXAMPLE 2.—*Red pigmented aeroplane dope*

| | Parts by weight |
|---|---|
| Cadmium red | 3.9 |
| Tricresyl phosphate | 2.8 |
| Ethyl cellulose (44.5% ethoxyl) (viscosity 45-50 seconds) | 15.0 |
| Ethanol | 32.6 |
| Toluol | 39.2 |
| Xylol | 6.5 |
| | 100.0 |

EXAMPLE 3.—*Composition suitable also for rigid surfaces*

| | Parts by weight |
|---|---|
| Ethyl cellulose (46% ethoxyl) | 13.7 |
| Run manila gum | 4.5 |
| Dibutyl phthalate | 2.6 |
| Butanol | 18.0 |
| Toluol | 36.0 |
| Xylol | 18.0 |
| Titanium dioxide | 7.2 |

Ethyl cellulose need not be the sole cellulose derivative. Where there are other cellulose derivatives present, the composition is considered to be an ethyl cellulose base composition so long as the content of other cellulose derivative present does not exceed the content of ethyl cellulose. Mineral oil is a hydrocarbon which injures films of ethyl cellulose with ethoxyl content above 47.5%. Its presence in a composition with ethyl cellulose of a lower ethoxyl content does not render the composition unstable. Mineral oil or wax imparts to the surface of a cellulose derivative containing it, a certain degree of "slip," which is desired in some uses, particularly where the surface rubs on itself.

*Uses of the composition*

Ethyl cellulose films are useful generally like nitrocellulose and cellulose acetate films. Nitrocellulose in many places is ruled out because of combustibility. Lacquers of cellulose acetate are more expensive than those of ethyl cellulose because of higher solvent cost. Ethyl cellulose lacquers may be made to have a greater tautening power than acetate lacquers in uses comparable to coating aeroplane wings. Aeroplane wings are representative of textile fabric mounted in diaphragm fashion, subject to being tautened by a proper composition.

Another important advantage of films from the lacquers of the present invention is high stability at high humidity. The films of the present invention are more durable than nitrocellulose base films, but close to or better than acetate films in durability. The films of the present invention have high heat durability, exceeding that of cellulose esters.

Heretofore, ethyl cellulose has not been considered satisfactory as an aeroplane dope base, because of the inability of prior users to obtain satisfactory tautness in test panels. The present invention overcomes these disadvantages. As an additional property we secure hydrocarbon resistance by using ethyl cellulose having upwardly from 42% to below 47.5% ethoxyl content. Mercerized cotton is an excellent base to be covered by aeroplane wings. The invention therefore contemplates as a new product a secured fabric, as of linen, cotton, or silk, treated to impregnate and coat with a liquid composition of the present invention whereby the fabric is shrunk or altered to become taut in its secured position, as on an aeroplane wing.

It is also useful on awnings, tents, screens, fabric covered boats, upholstery, shower curtains, window shades, dress goods, conveyer belts, paper, magazine covers, book jackets, posters, and the like. It waterproofs, and protects ink and the like, giving high gloss. Most of all, it permits cleansing with hydrocarbon cleansers, commonly considered harmless as cleansers, but in fact injurious to ethyl cellulose above 47.5% ethoxyl content.

In the foregoing, the viscosity given is that determined according to the method outlined in "Navy Aeronautical Specification for Inspection of Organic Protective Coatings for Aircraft", ST-15-d, Paragraph C-3 b (3), using a 20% solution of ethyl cellulose in 80% toluol, and 20% ethyl alcohol by weight.

Wherein ethyl cellulose base coating is referred to, it is here defined for the purpose of this invention as any coating, whether clear or pigmented or dyed, containing ethyl cellulose, whether or not modified by the addition of another cellulose compound, resins, plasticizers or oils, and in which the formulation is such that the ethyl cellulose content thereof having upwardly from 42% to below 47.5% ethoxyl content, may be substituted by an ethyl cellulose having an ethoxyl content higher than 47.5%, to form a new formulation or coat which is capable of being injured by a hydrocarbon as a result of the change, or which is unstable if hydrocarbon is included in the ultimate coat.

We claim:

1. A method of treating textile fabric mounted in diaphragm fashion, which comprises applying to the mounted woven fabric a film-forming coating solution comprising volatile solvent and dissolved ethyl cellulose having an ethoxyl content essentially in the range upwardly from 42% to below 47.5% by weight, and having plasticizer in the proportion of about 1 part by weight to at least about 4 to 5 parts by weight of said ethyl cellulose, and evaporating the volatile solvent to form a film, whereby the treated fabric is shrunk and tautened in its mounting, and is resistant to damage by contact with gasoline and like hydrocarbons.

2. Aeroplane dope comprising plasticizer and ethyl cellulose having an ethoxyl content essentially in the range upwardly from 42% to below 47.5% by weight to provide gasoline-resistance to aeroplane surfaces coated therewith, there being about 1 part by weight of plasticizer to at least 4 to 5 parts by weight of said ethyl cellulose to impart tautening power to the composition.

3. Aeroplane dope comprising plasticizer and ethyl cellulose having an ethoxyl content essentially in the range upwardly from 42% to below 47.5% by weight to provide gasoline-resistance to aeroplane surfaces coated therewith, there being about 1 part by weight of tricresyl phosphate to at least 4 to 5 parts by weight of said ethyl cellulose to impart tautening power to the composition.

4. A diaphragm comprising a textile fabric mounted as a diaphragm and taut, said fabric being doped with a tautening composition containing about 1 part by weight of plasticizer and at least 4 to 5 parts by weight of ethyl cellulose having an ethoxyl content upwardly from 42% to below 47.5% by weight, whereby to impart hydrocarbon resistance to said doped fabric.

LOUIS PERENY.
GEORGE A. MEISINGER.